United States Patent [19]

Hoyer et al.

[11] 4,293,306
[45] Oct. 6, 1981

[54] PROCESS FOR THE DYEING AND PRINTING OF HYDROPHOBIC SYNTHETIC ORGANIC FIBER MATERIALS WITH WATER-INSOLUBLE AZO DYESTUFFS

[75] Inventors: Ernst Hoyer, Frankfurt am Main, Fed. Rep. of Germany; Willi Steckelberg, Coventry, R.I.; Walter Deucker, Bad Soden am Taunus; Rudolf Schickfluss, Kelkheim, both of Fed. Rep. of Germany

[73] Assignee: Hoechst Aktiengesellschaft, Frankfurt am Main, Fed. Rep. of Germany

[21] Appl. No.: 118,902

[22] Filed: Feb. 6, 1980

[30] Foreign Application Priority Data

Feb. 8, 1979 [DE] Fed. Rep. of Germany ....... 2904752

[51] Int. Cl.$^3$ .............................................. C09B 29/36
[52] U.S. Cl. ............................................ 8/471; 8/662; 8/670; 8/922; 260/157
[58] Field of Search ........................ 8/471, 662, 922; 260/157

[56] References Cited

U.S. PATENT DOCUMENTS 3,134,764 5/1964 Blout et al. ..................... 260/162
4,124,580 11/1978 Takayanagi ..................... 260/157

FOREIGN PATENT DOCUMENTS 1414503 11/1975 United Kingdom .

OTHER PUBLICATIONS

A. M. Khalil et al., *Chemical Abstracts*, 1977, 87, 153281p.

*Primary Examiner*—A. Lionel Clingman
*Attorney, Agent, or Firm*—Curtis, Morris & Safford

[57] ABSTRACT

A process for the dyeing or printing of a hydrophobic organic fibrous material containing or consisting of polyester, wherein (a) the fibrous material is dyed ($\alpha$) from an aqueous dispersion with a dyestuff of the formula (1) indicated below at a pH value between 2 and 9 and at a temperature above 100° C. or at about 100° C. in the presence of a carrier, or ($\beta$) by impregnating it with an aqueous dispersion of a dyestuff of the formula (1), said dispersion having a pH value between 2 and 9, and subsequently exposing the fibrous material so treated to a short heat treatment between about 180° and 210° C., or (b) the fibrous material is printed with a dyestuff of the formula (1) by the transfer printing method, the dyestuff used in methods (a) and (b) being of the formula (1)

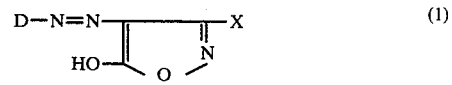

in which X represents alkyl of 1 to 4 carbon atoms, phenyl, lower alkyl-phenyl, lower alkoxy-phenyl, nitro-phenyl, chloro-phenyl or bromo-phenyl, and D represents phenyl, lower alkyl-phenyl, lower alkoxy-phenylene, nitro-phenylene, chloro-phenylene, benzoyl-phenylene, phenyl-phenylene, phenoxy-phenylene, lower alkyl-sulfonyl-phenylene, aminocarbonyl-phenylene, aminosulfonyl-phenyl,

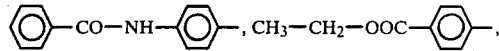

chloro-nitro-phenyl, lower alkyl-nitro-phenyl, lower alkoxy-nitro-phenyl, di(cyano)-phenyl, trifluoromethyl-nitro-phenyl or hydroxyalkoxy-nitro-phenyl.

1 Claim, No Drawings

PROCESS FOR THE DYEING AND PRINTING OF HYDROPHOBIC SYNTHETIC ORGANIC FIBER MATERIALS WITH WATER-INSOLUBLE AZO DYESTUFFS

The present invention relates to a novel process for the dyeing or printing of hydrophobic synthetic organic fiber materials, which comprises using water-insoluble azo dyestuffs of the formula (I)

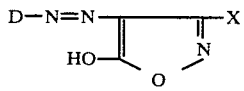

in which X is alkyl of from 1 to 4 carbon atoms, especially methyl, or the phenyl group which may be substituted by alkyl of from 1 to 4 carbon atoms, alkoxy of from 1 to 4 carbon atoms, halogen atoms, preferably fluorine, chlorine and/or bromine atoms, and/or nitro groups, and D stands for the radical of an aromatic diazo component.

Suitable radicals D are those of the diphenyl and naphthalene series, and especially of the benzene series, which may contain non-hydrosolubilizing substituents that are common in dyestuff chemistry, such as halogen atoms, for example chlorine and/or bromine atoms, alkyl, alkoxy, aryl, aryloxy, nitro, cyano, trifluoromethyl, alkylcarbonyl, alkylsulfonyl, alkoxycarbonyl, arylcarbonyl, arylsulfonyl, alkylcarbonylamino, arylcarbonylamino, arylazo, sulfamoyl and/or carbamoyl radicals, the alkyl and alkoxy groups preferably being in each case those with from 1 to 4 carbon atoms, and the aryl groups preferably being phenyl radicals which may be substituted by halogen atoms, $C_1$–$C_4$-alkyl and/or $C_1$–$C_4$-alkoxy groups.

Particularly valuable dyestuffs within the scope of formula (I) are those of the formula (II)

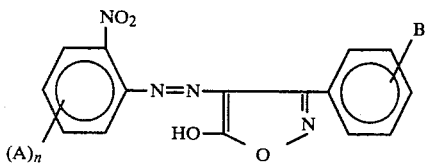

in which A is hydrogen, methyl, methoxy, ethoxy, β-hydroxy-ethoxy or chlorine or bromine, trifluoromethyl or alkoxy-$C_1$–$C_4$-carbonyl, and B is hydrogen or halogen, preferably chlorine or bromine, or nitro, methyl or methoxy, and n stands for the integer 0, 1 or 2.

The azo dyestuffs of the formula (I) used according to the present invention may be prepared in known manner by combining diazotized amines of the formula (III)

 D—NH₂ (III)

in which D is defined as above, with coupling components of formula (IV)

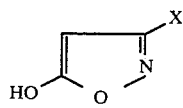

in which X is defined as above.

The azo dyestuffs of the formula (I) employed in the following may also be prepared by coupling diazotized amines of the formula

 D—NH₂ (III)

in which D is defined as above, with compounds of the formula (V)

 X—CO—CH₂—COOR (V), in which X is defined as above and R stands for alkyl of from 1 to 4 carbon atoms, while obtaining azo compounds of the formula (VI)

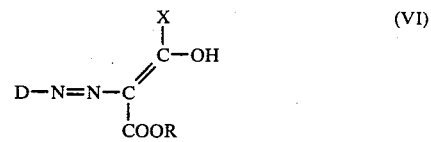

in which D, X and R are defined as above. The compounds of the above-mentioned formula (VI) thus obtained may then be reacted in known manner with hydroxylamine to give the axo dyestuffs of the above-mentioned formula (I).

As hydrophobic synthetic organic fiber materials there may be mentioned, for example, those of cellulose esters, polyesters, polyurethanes, polyolefins or polyamides.

Of the above-specified fiber materials, there are preferred for the present dyeing and printing process those of cellulose esters, such as cellulose-di-, -2½- and -triacetate, those of polyamides, such as polycaprolactam or polyhexamethylene diaminoadipate, and especially those of polyesters, such as polyethyleneglycol terephthalate. It is possible to subject the synthetic fiber materials to the dyeing and printing process of the invention, not only in their pure form, but also in the form of mixtures with one another or with natural fiber materials, such as cellulose fibers or wool.

For this purpose, the fiber materials may be present in the various states of processing, for example as threads, flocks, slubbings or piece goods, such as fabrics, knitted goods or non-woven fabrics, or as ready-made articles.

When applying the azo dyestuffs in accordance with the invention for the dyeing or printing of the above-mentioned fiber materials, said dyestuffs are preferably employed in the form of a preparation, for example an aqueous dispersion or solution in organic solvents or in an emulsion or dispersion optionally containing water besides a solvent or solvent mixture.

In order to prepare dispersions, the dyestuffs are finely distributed in the presence of dispersing agents and, optionally, further grinding auxiliaries. Thereafter aqueous dispersions are especially suitable for the manufacture of dry dyestuff preparations which then contain, besides the dyestuff, the dispersing agents employed and optionally the grinding auxiliaries used. It is an essential feature of these dyestuff preparations that they yield, upon introduction into water without using special devices for fine dispersion, once again a dyestuff dispersion exhibiting a degree of fine distribution achieved prior to the drying. The aqueous dispersions may be dried in various ways, for example by evaporation with air at normal pressure or with vacuum drying devices or by spray drying in apparatus designed for this purpose.

The dyeing is executed according to known processes, the dyeing conditions depending largely on the type of the synthetic fiber materials and their state of processing. For example, polyester fibers are dyed preferably from an aqueous dispersion at a temperature of more than 100° C. under pressure. However, the dyeing may also be performed at the boiling point of water in the presence of dyestuff carriers, such as phenylphenols, polychlorobenzene compounds, methylnaphthalene or similar auxiliary agents. Full dyeings are also obtained if fabrics or knitted goods of polyester fibers are impregnated with suspensions of one of the azo dyestuffs or a mixture of these dyestuffs and are then subjected to a short-(time-wise) heat treatment, for example at a temperature of from 180° to 210° C.

Cellulose-2½-acetate is preferably dyed at a temperature of from 65° to 85° C., and cellulose triacetate at a temperature of up to about 115° C. Fiber materials of polyamide are dyed near boiling temperature in the range of from 90° to 95° C. When dyeing cellulose-2½-acetate or polyamide fibers, the use of dyestuff carriers is not required.

The most favorable pH value of the dye baths from which the above-mentioned substrates are dyed is in the range of from 2 to 9, especially from 4 to 8.

In order to adjust the intended pH, there are used, for example, aqueous solutions of ammonium sulfate, sodium- or ammonium-o-phosphate, sodium acetate, sulfuric acid or acetic acid.

In order to improve the fastness to rubbing, the dyed material is suitably freed from any dyestuff adhering to the surface, for example by thorough rinsing, but in particular by common aftertreatment methods, such as washing with emulsifying agents or a reductive aftertreatment.

When dyeing the above-specified fiber materials from organic solvents, the azo dyestuff is either allowed to be absorbed from the solution onto the substrate according to the batchwise exhaustion process, preferably at 70° to 130° C., or the dyeing is carried out according to the continuous thermosol process, according to which the substrate, present for example in the form of a fabric, is impregnated with an organic dyestuff solution, subsequently dried and subjected to a short-(time-wise) heat treatment, for example at 180° to 210° C.

As solvents for the batchwise exhaustion process there may be mentioned water-immiscible solvents having a boiling point of from 40° to 170° C., such as the aliphatic halogenated hydrocarbons, for example methylene chloride, trichloroethane, trichloroethylene and perchloroethylene.

For the continuous dyeing process, there may also be used in particular water-miscible solvents, for example alcohols, such as alkanols of from 1 to 4 carbon atoms, or dimethyl formamide.

The solvents may also be present as mixtures and contain further auxiliary agents soluble in the solvents, for example oxalkylation products of fatty alcohols, alkylphenols and fatty acids.

The prints on the above-specified fiber materials with the use of the azo dyestuffs (I) according to the invention are also prepared according to known processes. For example, in the case of polyester fiber material, the dyestuffs may be employed in aqueous preparations which contain appropriate thickeners and fixing accelerators besides the finely distributed dyestuff.

The fixation is performed, for example, following the printing and drying by steaming at atmospheric pressure within 30 to 60 minutes or under elevated pressure of up to 2 atmospheres within 10 to 30 minutes. Said process may likewise be carried out under the action of superheated steam or hot air of 150° to 220° C. within 30 to 90 seconds.

The azo dyestuffs (I) are particularly suitable for preparing prints in accordance with the transfer process, i.e., the so-called transfer printing, according to which there may be printed not only the above-mentioned synthetic fiber materials as well as their mixtures with one another or with natural fiber materials, but optionally also natural fibers having been finished accordingly, such as cellulose fibers which have been treated, for example prior to printing with appropriate synthetic resins. For this purpose printing inks which contain binding agents, water and/or an organic solvent besides the finely dispersed dyestuff are first applied onto an inert carrier, for example onto plastic sheets or aluminum foils which are resistant to the temperatures applied, or, preferably, onto paper, and then dried. Thereafter the treated side of the carrier is brought into contact with the surface of the fiber material, for example polyester fabric, or polyester non-woven or knitted goods, whereupon the carrier and the fiber material are subjected—under mechanical pressure, if required—to a heat treatment at 150° to 230° C., preferably 170° to 210° C., for a period of from 2 to 60 seconds, and the dyed fiber material is then separated from the carrier.

When the azo dyestuffs (I) (whose affinity, which is indeed excellent, can be further improved by mixing two or more of the above-mentioned dyestuffs ), are used according to the invention, bright and clear greenish yellow to yellowish orange dyeings can be obtained on the above-mentioned fiber materials, which dyeings show a very good fastness to wetting, washing, gas fading and light.

The following Examples illustrate the invention.

The parts represent parts by weight. Parts by volume have been expressly indicated as such and are to the liter as the part is to the kilogram.

EXAMPLE 1

100 Parts of yarn of polyethylene-glycol terephthalate are dyed for 1.5 hours at 95° to 98° C. in 2000 parts of a dye bath containing 1 part of the dyestuff of the formula

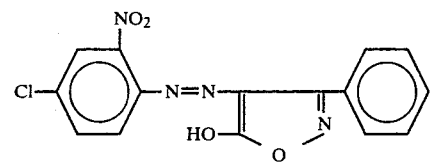

in a finely dispersed form as well as 12 parts of a commercial dyeing accelerator based on o-phenylphenol and 12 parts of ammonium-o-phosphate. The dyed material is subsequently subjected for 20 minutes at 80° C. to a reductive aftertreatment in another bath which contains per 100 parts 2 parts of sodium dithionite and 2 parts of 33% by weight sodium hydroxide solution; thereafter it is carefully rinsed and dried.

With a very good exhaustion of the dye bath a polyester yarn is obtained which is dyed in a clear greenish yellow shade. The dyeing is marked by good fastness properties, in particular the very good fastness to light.

The above-mentioned dyestuff may be prepared as follows:

17.2 Parts of 4-chloro-2-nitro-aniline are stirred in 46.5 parts of about 30% by weight hydrochloric acid. 17.5 Grams of 40% by weight sodium nitrite solution are added dropwise, with simultaneous external cooling and while adding 50 g of ice and 50 g of water. To complete the diazotization, stirring of the mixture is continued for 2 hours at 0° to 5° C., whereupon any excess nitrite possibly present is destroyed by adding amidosulfonic acid. The solution of the diazonium salt is clarified with silica gel.

16.1 Parts of 3-phenyl-isoxazolone-(5) are dissolved in 50 parts by volume of 2 N sodium hydroxide solution. The mixture is then diluted with 250 parts by volume of ice water. Thereafter the diazo solution prepared as has been described above is added dropwise within 20 minutes, the temperature of the batch is maintained at 0° to 5° C. by adding 150 parts of ice, and the pH is kept at 8 to 11 by adding sodium hydroxide solution. After stirring for another 30 minutes the mixture is adjusted to a pH of 6.5 by adding glacial acetic acid. Stirring of the dyestuff suspension is continued for another 2 hours, then filtered off with suction and washed with water until it becomes neutral and free from salt.

EXAMPLE 2

15 Parts of the dyestuff of the formula

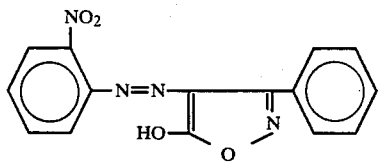

15 parts of a commercial condensation product of formaldehyde and a naphthalene-sulfonic acid which represents an ionogenic dispersing auxiliary agent, as well as 120 parts of water, are ground in a ball mill to give a fine dispersion and are then made up with water to 2000 parts.

This dye liquor serves to impregnate polyester fabric on the padder in common manner. Subsequently the fabric is squeezed off to a weight increase of 70%, dried in a dryer at about 100° C. and then treated for about 60 seconds with hot air of 210° C. The dyed material is rinsed with water, subjected to the reductive aftertreatment as described in Example 1, rinsed again and dried.

In this manner there are obtained full dyeings in a greenish yellow with good fastness properties. The dyestuff employed is prepared in the manner described in Example 1.

EXAMPLE 3

0.2 Part of the dyestuff of the formula

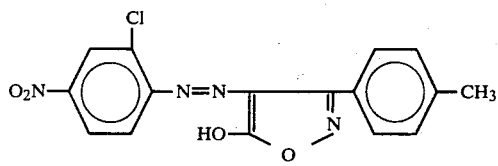

is finely dispersed in 200 parts of water in common manner. After the pH has been adjusted to be of from 4 to 5 with a small amount of aqueous sulfuric acid, 20 parts of polyester fabric are dyed in the dye bath thus prepared for 1 hour at 130° C. with the apparatus being closed. The dyed material is subsequently aftertreated and finished as has been described in Example 1. The yellow dyeing obtained is distinguished by good fastness properties.

EXAMPLE 4

0.08 Part of the dyestuff of the formula

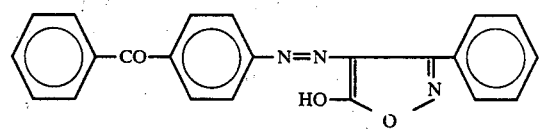

is dissolved in 8 parts of dimethylformamide. Said solution is introduced, while stirring, into 400 parts of water to which 1 part of a commercial non-ionogenic dyeing auxiliary (with a dispersing and levelling action) based on a highly oxethylated vegetable fat has previously been added. Into the dye bath thus prepared, whose pH has been adjusted to 5 with ammonium sulfate and acetic acid, there are introduced 8 parts of a polyamide fabric based on caprolactam at 40° C. Subsequently the bath is heated within 45 minutes to 90° to 95° and is maintained at this temperature for 1 hour. The fabric dyed in this manner is rinsed with water, aftertreated for 10 minutes at 50° C. in another bath containing 1 part of a commercial wetting, washing and dispersing agent based on an oxethylated alkyl phenol in 1000 parts of water, washed again in water and dried.

With a good exhaustion of the dye bath a reddish yellow dyeing with good fastness properties is thus obtained on the above-mentioned polyamide fabric, the high fastness to light being particularly surprising.

EXAMPLE 5

A polyester fabric is impregnated in common manner on the padder with a solution of 10 parts of the dyestuff of the formula

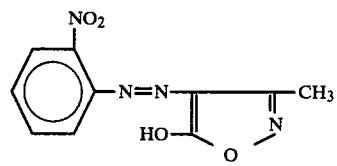

in 1000 parts by volume of perchloroethylene, is then squeezed off to a weight increase of about 90% and is dried in a drying apparatus at about 100° C. Thereafter it is treated for fixation with hot air of 210° C. for 60 seconds. The dyed fabric is subsequently rinsed with perchloroethylene at room temperature and then dried. The greenish yellow dyeing obtained on the polyester fabric is distinguished by good fastness properties.

The above-mentioned dyestuff may be prepared as follows: 13.8 Parts of 2-nitro-aniline are dissolved, while hot, in 600 parts by volume of diluted hydrochloric acid. The hot solution is introduced into a mixture of 17.5 parts of 40% sodium nitrite solution and 250 parts of ice. To complete the diazotization, stirring is continued for 1 hour at 0° to 5° C. Thereafter the excess nitrite is destroyed with amidosulfonic acid, and the solution of the diazonium salt is clarified with kieselguhr. 13 Parts of acetoacetic acid-ethyl ester are suspended in 200 parts by volume of ice water; then a pH of 7.5 is adjusted by adding 2 N sodium hydroxide solution. The above-described diazo solution is then added dropwise to the solution thus obtained, while adding ice, at a temperature of from 0° to 5° C. The pH value of 7.5 is maintained by adding a further amount of sodium hydroxide solution. The resulting product is filtered off with suction and dried.

14 Parts of the product thus obtained are stirred in 80 parts by volume of ethanol, then 10 parts of hydroxylamine hydrochloride and 5 parts of anhydrous sodium acetate are added, and the mixture is heated at boiling point for 3 hours. Subsequently it is allowed to cool, 80 parts of water are added, and the isoxazolone dyestuff is filtered off with suction.

EXAMPLE 6

A polyester fabric is printed with a printing paste containing in 1000 parts, besides the commercial thickener alginate and further common additives, 200 parts of a 10% by weight aqueous dispersion of the dyestuff of the formula

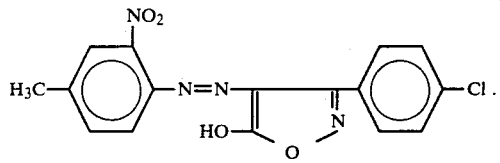

Thereafter the fabric is dried and treated for fixation with hot air of 200° for 60 seconds. The printed fabric is then subjected to a reductive aftertreatment, rinsed with water and dried.

In accordance with a process thus performed there are obtained clear yellow prints of good fastness properties.

EXAMPLE 7

50 Parts of the dyestuff of the formula

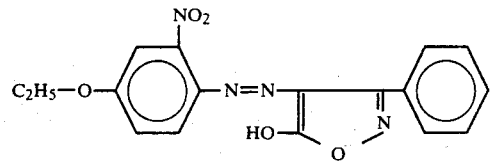

5 parts of a condensation product of formaldehyde and naphthalene-sulfonic acid and 70 parts of water are ground in a ball mill, until a sufficient fine division of the dyestuff has been achieved.

100 Parts of this 40% by weight dyestuff preparation are introduced by stirring into 960 parts of a commercial varnish.

The printing ink thus obtained is then applied onto paper by means of a gravure printing machine. If this paper is brought into close contact with a fabric of polyester fibers for 30 seconds at 200° C., a full print in a reddish yellow with very good fastness properties is obtained on the polyester material.

The following Table shows further dyestuffs of the formula I which may be employed in accordance with the invention.

TABLE

| Example | Dyestuff | Shade on polyester fibers |
|---|---|---|
| 8 | Ph—N=N—C₆H₄—N=N—(isoxazolone-Ph) | reddish yellow |
| 9 | HO—CH₂—CH₂—O—(NO₂-Ph)—N=N—(isoxazolone-Ph) | reddish yellow |
| 10 | (o-CH₃-Ph)—N=N—(o-CH₃-Ph)—N=N—(isoxazolone-Ph) | reddish yellow |
| 11 | Ph—N=N—(CH₃-Ph)—N=N—(isoxazolone-Ph) | reddish yellow |
| 12 | (OCH₃-Ph)—N=N—(OCH₃-Ph)—N=N—(isoxazolone-Ph) | reddish yellow |
| 13 | O₂N—Ph—N=N—Ph—N=N—(isoxazolone-Ph) | reddish yellow |

TABLE-continued

| Example | Dyestuff | Shade on polyester fibers |
|---|---|---|
| 14 | O₂N–C₆H₄–N=N–C₆H₃(CH₃)–N=N–[isoxazole(HO)(phenyl)] | yellowish brown |
| 15 | C₆H₅–N=N–C₆H₄–N=N–[isoxazole(HO)(CH₃)] | yellow |
| 16 | 4-Cl,2-NO₂-C₆H₃–N=N–[isoxazole(HO)(4-NO₂-C₆H₄)] | reddish yellow |
| 17 | 2-Cl-C₆H₄–N=N–[isoxazole(HO)(phenyl)] | greenish yellow |
| 18 | H₃C–H₂C–OOC–C₆H₄–N=N–[isoxazole(HO)(phenyl)] | greenish yellow |
| 19 | H₃CO–C₆H₄–N=N–[isoxazole(HO)(phenyl)] | reddish yellow |
| 20 | 4-F₃C,2-NO₂-C₆H₃–N=N–[isoxazole(HO)(phenyl)] | reddish yellow |
| 21 | 4-H₃CO,2-NO₂-C₆H₃–N=N–[isoxazole(HO)(phenyl)] | reddish yellow |
| 22 | 4-H₃C,2-NO₂-C₆H₃–N=N–[isoxazole(4-OCH₃-C₆H₄)] | yellow |
| 23 | (biphenyl)–N=N–[isoxazole(HO)(CH₃)] | yellow |
| 24 | C₂H₅SO₂–C₆H₄–N=N–[isoxazole(HO)(phenyl)] | greenish yellow |
| 25 | C₆H₅–O–C₆H₄–N=N–[isoxazole(HO)(phenyl)] | yellow |
| 26 | 4-O₂N,2-Cl-C₆H₃–N=N–[isoxazole(HO)(phenyl)] | yellow |
| 27 | O₂N–C₆H₄–N=N–[isoxazole(HO)(phenyl)] | yellow |

TABLE-continued

| Example | Dyestuff | Shade on polyester fibers |
|---|---|---|
| 28 | 2,4-dicyanophenyl-N=N-(4-hydroxy-3-phenyl-isoxazol-5-yl) | yellow |
| 29 | 4-acetylphenyl-N=N-(4-hydroxy-3-(2-chlorophenyl)-isoxazol-5-yl) | greenish yellow |
| 30 | 4-carbamoylphenyl-N=N-(4-hydroxy-3-phenyl-isoxazol-5-yl) | greenish yellow |
| 31 | 4-sulfamoylphenyl-N=N-(4-hydroxy-3-phenyl-isoxazol-5-yl) | greenish yellow |
| 32 | 4-benzamidophenyl-N=N-(4-hydroxy-3-phenyl-isoxazol-5-yl) | yellow |
| 33 | 4-acetamidophenyl-N=N-(4-hydroxy-3-phenyl-isoxazol-5-yl) | yellow |
| 34 | 4-chloro-2-nitrophenyl-N=N-(4-hydroxy-3-(3-chlorophenyl)-isoxazol-5-yl) | yellow |
| 35 | 4-(2-hydroxyethoxy)-2-nitrophenyl-N=N-(4-hydroxy-3-(4-methylphenyl)-isoxazol-5-yl) | reddish yellow |
| 36 | 4-ethoxy-2-nitrophenyl-N=N-(4-hydroxy-3-methyl-isoxazol-5-yl) | yellow |
| 37 | 4-methoxy-2-nitrophenyl-N=N-(4-hydroxy-3-(4-nitrophenyl)-isoxazol-5-yl) | reddish yellow |
| 38 | 4-methyl-2-nitrophenyl-N=N-(4-hydroxy-3-phenyl-isoxazol-5-yl) | yellow |
| 39 | 2-nitrophenyl-N=N-(4-hydroxy-3-(2-chlorophenyl)-isoxazol-5-yl) | yellow |
| 40 | 4-bromo-2-nitrophenyl-N=N-(4-hydroxy-3-phenyl-isoxazol-5-yl) | yellow |

TABLE-continued

| Example | Dyestuff | Shade on polyester fibers |
|---|---|---|
| 41 | 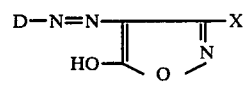 | yellow |
| 42 | 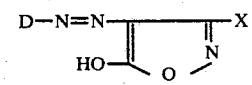 | reddish yellow |

We claim:

1. A process for the dyeing or printing of a hydrophobic organic fibrous material containing or consisting of a polyester, which comprises dyeing said fibrous material from an aqueous dispersion with a dyestuff of the formula

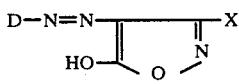

in which X is alkyl of from 1 to 4 carbon atoms, phenyl, lower alkyl-phenyl, lower alkoxy-phenyl, nitrophenyl, chlorophenyl or bromophenyl, and D is phenyl, lower alkyl-phenyl, lower alkoxy-phenyl, nitro-phenyl, chloro-phenyl, benzoyl-phenyl, phenyl-phenyl, phenoxy-phenyl, lower alkylsulfonyl-phenyl, aminocarbonyl-phenyl, aminosulfonyl-phenyl,

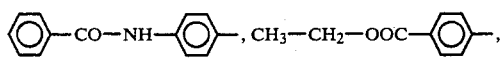

chloro-nitro-phenyl, lower alkyl-nitro-phenyl, lower alkoxy-nitro-phenyl, (di(cyano)-phenyl, trifluoromethyl-nitro-phenyl or hydroxyalkoxy-nitro-phenyl at a pH value of from 2 to 9 and at a temperature above 100° C. under pressure, or at about 100° C. in the presence of a carrier, or by impregnating said fibrous material with an aqueous dispersion of a dyestuff of said formula

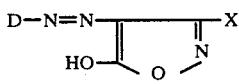

said dispersion having a pH-value of from 2 to 9, and subsequently exposing the impregnated fibrous material to a short heat treatment between about 180° and 210° C., or which comprises, in accordance with the transfer printing method, printing an inert carrier material consisting of paper, a foil of a heat resistant resin or aluminum with a printing ink containing as essential ingredients water or an organic solvent, a common binding agent and a dyestuff of said formula

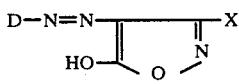

in a finely divided state, bringing the printed side of the carrier material in close contact with the fibrous material, exposing said materials to a short heat treatment between 170° and 210° C. while still in contact and separating the fibrous material from the carrier material.

* * * * *